Dec. 25, 1928.  H. C. HARRIS  1,696,201
PIVOTAL CONNECTION
Filed Sept. 28, 1925
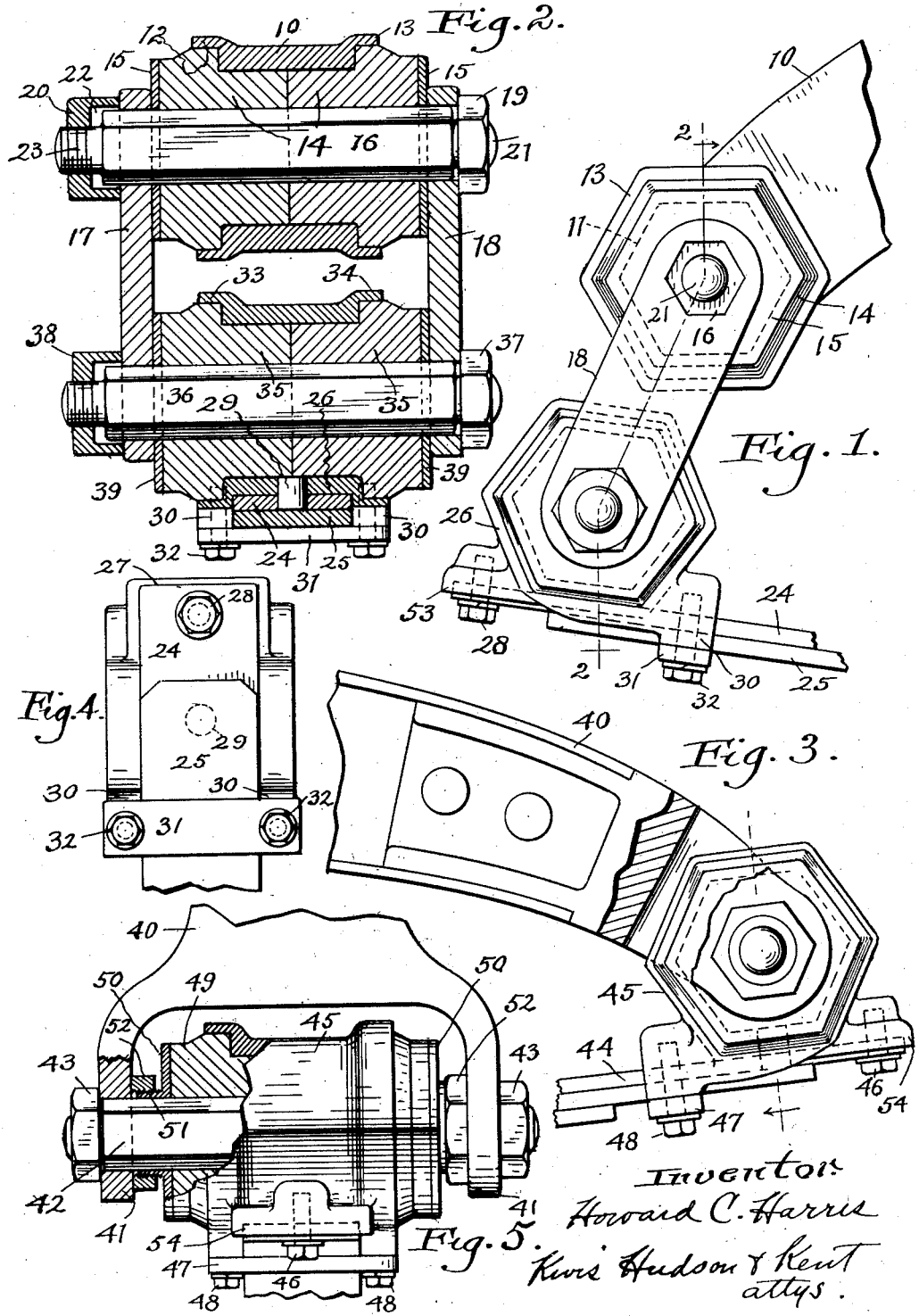

Patented Dec. 25, 1928.

1,696,201

UNITED STATES PATENT OFFICE.

HOWARD C. HARRIS, OF AKRON, OHIO.

PIVOTAL CONNECTION.

Application filed September 28, 1925. Serial No. 59,004.

This invention relates broadly to connections between relatively oscillatable members and more particularly to connections between springs and the frame of motor vehicles and constitutes an improvement over the invention described and claimed in my earlier application No. 39,970, filed June 27, 1925.

It is one of the objects of the present invention to provide an improved form of connection adapted for use in cases where the movement between the members is relatively small, so as to eliminate the usual journal bearings, which, in the case of spring connections, are subject to excessive wear and otherwise objectionable in their tendency to squeak and rattle.

A further object of the invention is to provide certain improvements over the disclosure of my aforesaid application that will reduce the cost and permit the use of a simpler form of spring-leaf construction, by eliminating the usual eyes that are formed on the ends of the main spring-leaves through the use of specially designed brackets that are to be attached to the ends of the main spring-leaf.

Other objects of the invention and the features of novelty will be apparent from the following description taken in connection with the accompanying drawings, of which:

Fig. 1 is a side elevation of a shackle connection embodying my invention;

Fig. 2 is a section on the line 2—2 of Fig. 1;

Fig. 3 is a side elevation of a pivotal connection directly between the spring and the frame, embodying my invention;

Fig. 4 is a bottom plan of the spring and bracket shown in Fig. 1; and

Fig. 5 is an end elevation of the construction shown in Fig. 3, with certain parts in section.

Referring to Figs. 1 and 2, of the drawings, 10 indicates one of the side members of a vehicle frame which is provided with an eye 11 of non-circular form, said eye being shown as hexagonal in the specific form of construction illustrated. The eye 11 has flanges 12 and 13 at its opposite ends, the interior of which form enlarged counterbores at the ends of the eye, preferably of the same shape as the eye itself. Fitted within the eye 11 is a rubber bushing preferably formed of two similar sections 14 having enlarged flanges to fit the counterbores formed by the flanges 12 and 13. The rubber sections 14 extend for some distance beyond the flanges 12 and 13 and have in engagement with their outer ends the plates 15. A pintle 16, of non-circular form is shown as of hexagonal cross-section, extends through the members 14, the latter being provided with openings conforming to and closely fitting the pintle 16. The plates 15 are perforated to receive the pintle 16 so as to be non-rotatably connected with the latter. The shackles 17 and 18 are fitted upon the ends of the pintle 16 so as to be non-rotatably connected therewith and are secured in position by the nuts 19 and 20, the nut 19 being arranged on the reduced threaded end 21 of the pintle 16 and the nut 20 being provided with a recess 22 for the hexagonal portion of the pintle and being threaded to receive the reduced threaded end 23 of the pintle so that the nut 20 is adapted to draw the parts together and compress the rubber members 14, in an axial direction.

The main leaf of the spring is indicated at 24 and one of the usual reinforcing leaves, at 25. It is customary to coil the ends of the main leaf, of a multiple leaf spring, to form eyes thereon, but according to my present invention, I dispense with this feature and secure on the end of the leaf 21 a bracket or eye member 26 which is formed in its lower side with a rectangular recess 27 to receive the end of the spring-leaf 24, the latter being secured to the member 26 by the screw 28. The member 26 is additionally secured to the leaf 24 by the dowel 29 and by the downwardly projecting lugs 30 which engage the edges of the leaf 24 so as to hold the member 26 from sidewise movement relative to the spring-leaves. A bar 31 extends between the lugs 30 and is secured thereto by the screws 32, this bar serving to secure the spring-leaves to the member 26, at that point, although the bar 31 should not clamp the leaf 25 but allow the latter to freely slide on the leaf 24 as may be required by the action of the spring. The member 26 is provided with a non-circular eye, similar to the eye 11 and with the flanges 33 and 34 providing counter-bores for the enlarged portions of the rubber members 35, which are similar to the members 14. A pintle 36, similar to the pintle 16, extends through the members 35 and is non-rotatably connected with the lower ends of the shackle members 17 and 18 and provided at its ends with the nuts 37 and 38, which are similar to the nuts 19 and 20, respectively. Plates 39, similar to the plates 15, and non-rotatably mounted in the pintle 36, are arranged between the ends of the members 35 and the shackle members 17 and 18.

By the construction just described the movements of the spring relative to the frame members 10 are accommodated by the torsional flexing of the rubber members 14 and 35 and since there is no relative movement between any of the contacting metal parts, there will be no wear of these parts, no surfaces to be lubricated and no points where rattles or squeaks could occur. The nuts 20 and 38 permit the compression of the members 14 and 35, in an axial direction, so that these members will closely conform to the pintles 16 and 36 and also to the eyes in which they are carried, so that there will be no opportunity for slippage of the rubber at these points and all movement will be compensated by flexing of the rubber members. The spacing of the plates 15 and 39 at some distance from the flanges 12, 13, 33 and 34, not only provides a sufficient body of rubber in the enlarged flanges of the rubber members, to take up the requisite torsional movements but also provides for the slight lateral movements between the pintles and the frame member 10 and the spring to cushion the lateral forces to which the parts are subjected in service.

In the form of the invention illustrated in Figs. 3 and 5, there is shown an application of the invention to a pivotal connection for connecting the end of the spring directly to the frame member. This form of connection is especially adapted for connecting the front end of the front spring with the front end of the frame member, the latter being shown at 40 and being bifurcated to provide the spaced arms 41 which carry the pintle 42, the latter being preferably of hexagonal cross-section and fitting correspondingly shaped holes in the arms 41 so as to be non-rotatable therein. The ends of the pintle 42 are reduced in size and threaded to receive the nuts 43 which secure the pintle in position. There is secured to the main spring-leaf 44, an eye member 45 that is substantially the same, in construction, as the member 26, previously described. The eye member 45 is secured to the leaf 44 by the screw 46 and the bar 47, the latter being secured to the member 45 by the screws 48. The rubber bushing between the pintle 42 and the eye member 45 is indicated at 49 and is formed of two sections similar to the members 44 and 35. At the ends of the bushing 49 are plates 50 having outwardly extending hubs 51 that are provided with hexagonal openings to fit the pintle 42, and externally threaded to receive the nuts 52 which bear against the inner faces of the arms 41 and are adapted to be turned for the purpose of moving the plates 50 endwise on the pintle 42. In this manner the bushing 49 may be compressed axially so as to expand it within the eye member 45 and also cause it to firmly grip the pintle 42.

This construction insures against turning of the rubber bushing either on the pintle or within the eye member 45 and, while I have shown the bushing as being of hexagonal shape on its exterior, yet it will be obvious that the same effect can be obtained by other noncircular shapes. The end of the spring-leaves 24 and 44, on account of abutting against the depending flanges 53 and 54, respectively, are adapted to transmit longitudinal forces in the spring to the eye members 24 and 44 and the dowels, such as the dowel 29, which are also provided, assist in transmitting these forces.

Having thus described my invention, I claim:

1. In apparatus of the class described, the combination of two relatively oscillatable members one of which has an eye of non-circular cross-section and the other a pintle of non-circular cross-section extending through said eye and carrying radially extending adjustable abutments spaced from the ends of said eye, and a rubber bushing fitting said eye and said pintle so as to be non-rotatably connected therewith and having enlarged flanges engaging said abutments and the ends of said eye.

2. In apparatus of the class described, the combination of two relatively oscillatable members, one of which has a non-expansible eye of non-circular cross-section and the other a pintle extending through said eye, a rubber bushing fitting said eye and said pintle so as to be non-rotatably connected therewith but readily detachable therefrom, plates abutting against the ends of said bushing and movable axially on said pintle but non-rotatable with respect thereto, and adjusting means for moving said plates axially of said pintle to compress said bushing in the axial direction.

3. In apparatus of the class described, the combination of two relatively oscillatable members one of which has an eye with enlarged counterbores at its ends of polygonal cross-section and the other a pintle of polygonal cross-section extending through said eye and having adjustable abutments spaced from the ends of said eye, and a rubber bushing fitting said eye and said counterbores and said pintle so as to be non-rotatably connected therewith.

4. In apparatus of the class described, the combination of a frame member, a spring and a flexible connection therebetween, comprising a pintle carried by the frame member, an eye member bolted to said spring and having a bore therethrough of non-circular cross-section, a rubber bushing on said pintle and fitting said bore so as to be non-rotatably connected to both, and adjusting means for compressing said bushing axially.

5. In apparatus of the class described, the combination of a frame member, a spring and a flexible connection therebetween, comprising a pintle of non-circular cross-section carried by the frame member, an eye member bolted to said spring and having enlarged counterbores at its ends of non-circular cross-section, a rubber bushing on said pintle and fitting said eye member and said counterbores, so as to be non-rotatable either on the pintle or in said eye member, and adjustable means engaging the ends of said bushing for compressing it axially.

6. In apparatus of the class described, the combination of a frame member, a multiple-leaf spring comprising a main lead and reinforcing leaves, an eye member on the end of said main leaf having flanges enclosing the side edges and end of the main leaf, means for rigidly securing said eye member to said main leaf including a transversely extending bar secured to the eye member and engaging one of said reinforcing leaves, said eye member having a non-circular opening extending transversely therethrough, a rubber bushing non-rotatably engaging said opening and provided with a central non-circular transverse bore, a pintle fitting said bore but non-rotatable therein, and means connecting said pintle with said frame member.

7. In apparatus of the class described, the combination of a multiple-leaf spring, an eye member on the end of the main leaf of said spring, and means for securing said eye member comprising a bolt extending through the end portion of the leaf and clamping it to the eye member, a dowel arranged in aligned openings in the leaf and the eye member, and a bar secured to the eye member and securing the same to said main leaf and one of the reinforcing leaves of the spring and said reinforcing leaf covering the said dowel opening in the main leaf.

In testimony whereof, I hereunto affix my signature.

HOWARD C. HARRIS.